US008774040B2

(12) United States Patent
Sakai (10) Patent No.: US 8,774,040 B2
(45) Date of Patent: Jul. 8, 2014

(54) COMMUNICATION APPARATUS, COMMUNICATION APPARATUS CONTROL METHOD, AND PROGRAM (75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 13/381,025

(22) PCT Filed: Jul. 1, 2010

(86) PCT No.: PCT/JP2010/004327
§ 371 (c)(1),
(2), (4) Date: Dec. 27, 2011

(87) PCT Pub. No.: WO2011/001683
PCT Pub. Date: Jan. 6, 2011

(65) Prior Publication Data
US 2012/0106496 A1 May 3, 2012

(30) Foreign Application Priority Data
Jul. 3, 2009 (JP) .................................. 2009-158944

(51) Int. Cl.
H04W 88/04 (2009.01)
H04W 72/04 (2009.01)
H04W 76/02 (2009.01)
H04W 76/04 (2009.01)
H04W 84/20 (2009.01)

(52) U.S. Cl.
USPC ............................ 370/252; 370/254; 370/338

(58) Field of Classification Search
CPC ..... H04W 88/06; H04W 28/18; H04W 8/005; H04W 84/12; H04W 84/18; H04W 48/18

USPC .......................................... 370/252, 254, 338
See application file for complete search history.

(56) References Cited

U.S. PATENT DOCUMENTS 7,522,551 B2 * 4/2009 Giaimo et al. ................. 370/328
7,769,837 B2 * 8/2010 Nogawa et al. ............... 709/222
(Continued)

FOREIGN PATENT DOCUMENTS

CN 101069385 A 11/2007
JP 2004-32552 A 1/2004
(Continued)

OTHER PUBLICATIONS

Wi-Fi Certified(TM) for Wi-Fi Protected Setup: Easing the User Experience for Home and Small Office Wi-Fi(R) Networks, http://www.wi-fi.org/wp/wifi-protected-setup; Wi-Fi Alliance, 2007-2008; pp. 1-14.

Primary Examiner — Ahmed Elallam
(74) Attorney, Agent, or Firm — Canon USA, Inc. IP Division (57) ABSTRACT A communication apparatus includes a first setting unit configured to operate as an access point that communicates with another communication apparatus to perform communication parameter setting processing, a second setting unit configured to operate as a station that communicates with an access point to perform communication parameter setting processing, a detection unit configured to detect an apparatus that is currently activating communication parameter setting processing, and a selection unit configured to select first setting processing to be performed by the first setting unit or second setting processing to be performed by the second setting unit according to a detection result obtained by the detection unit.

13 Claims, 7 Drawing Sheets

(56) References Cited

U.S. PATENT DOCUMENTS

| | | | |
|---|---|---|---|
| 8,150,980 B2* | 4/2012 | Sakai | 709/228 |
| 8,243,703 B2* | 8/2012 | Nakajima | 370/338 |
| 8,462,744 B2* | 6/2013 | Moritomo | 370/338 |
| 2007/0088951 A1* | 4/2007 | Nakajima | 713/171 |
| 2008/0028310 A1* | 1/2008 | Ouchi | 715/704 |
| 2009/0007226 A1* | 1/2009 | Fujii | 726/1 |
| 2009/0028341 A1* | 1/2009 | Hamachi | 380/278 |
| 2009/0097464 A1* | 4/2009 | Sakoda | 370/338 |
| 2010/0232305 A1* | 9/2010 | Shichino | 370/252 |
| 2012/0106396 A1* | 5/2012 | Sakai | 370/254 |

FOREIGN PATENT DOCUMENTS

| | | | | |
|---|---|---|---|---|
| JP | 2004-357057 A | | 12/2004 | |
| JP | 2004357057 A | * | 12/2004 | ............. H04L 12/28 |
| JP | 2006-148448 A | | 6/2006 | |
| JP | 2006-309458 A | | 11/2006 | |
| JP | 2006-311138 A | | 11/2006 | |
| JP | 2006-352282 A | | 12/2006 | |
| JP | 2008-035373 A | | 2/2008 | |
| JP | 2008-283590 A | | 11/2008 | |
| WO | 2005-034434 A1 | | 4/2005 | |

* cited by examiner

COMMUNICATION APPARATUS, COMMUNICATION APPARATUS CONTROL METHOD, AND PROGRAM

TECHNICAL FIELD

The present invention relates to a communication apparatus, a method for controlling the communication apparatus, and a program.

BACKGROUND ART

The wireless communication is, for example, represented by a wireless local area network (LAN) that conforms to the IEEE802.11 series standard which requires numerous setting items to be set before a communication apparatus is used. For example, communication parameters, such as service set identification (SSID) as a network identifier, an encryption method, an encryption key, an authentication method, and an authentication key, are necessary setting items to be set in advance when each communication apparatus performs wireless communication. Manually inputting this kind of setting items beforehand is very troublesome for users of communication apparatuses.

To solve this problem, there are conventional automatic setting methods for simply setting communication parameters to a wireless device, which are available from manufacturers of the communication apparatuses. For example, when a conventionally discussed automatic setting method is applied to two devices connected with each other, one device can provide communication parameters to the other device according to a predetermined procedure and messages and the other device can automatically set the provided communication parameters.

Wi-Fi CERTIFIED™ for Wi-Fi Protected Setup: Easing the User Experience for Home and Small Office Wi-Fi®, Networks, http://www.wi-fi.org/wp/wifi-protected-setup introduces an example of the automatic setting of communication parameters in a wireless LAN infrastructure mode communication (hereinafter, referred to as "-").

Japanese Patent Applications Laid-Open No. 2006-352282, No. 2006-311138, and No. 2006-309458 discuss examples of the automatic setting of communication parameters in a wireless LAN ad hoc network mode communication (hereinafter, referred to as "ad hoc communication"). According to the automatic communication parameter setting processing discussed in Japanese Patent Applications Laid-Open No. 2006-352282, No. 2006-311138, and No. 2006-309458, a device that performs ad hoc communication selects a device from a plurality of devices that join the network as an apparatus (a providing apparatus) that provides communication parameters and the providing apparatus provides communication parameters to another device (a reception apparatus).

As described above, conventionally discussed techniques for automatically setting communication parameters enable users to easily set the communication parameters automatically with a simple operation.

Further, as discussed in Japanese Patent Application Laid-Open No. 2008-035373, there is a conventional apparatus that includes an access point function and a station function and enables users to perform switching between the access point function and the station function.

CITATION LIST

Patent Literature

PTL 1: Japanese Patent Application Laid-Open No. 2006-352282

PTL 2: Japanese Patent Application Laid-Open No. 2006-311138

PTL 3: Japanese Patent Application Laid-Open No. 2006-309458

PTL 4: Japanese Patent Application Laid-Open No. 2008-035373

Non Patent Literature

NPL 1: Wi-Fi CERTIFIED™ for Wi-Fi Protected Setup: Easing the User Experience for Home and Small Office Wi-Fi®, Networks, http://www.wi-fi.org/wp/witi-protected-setup

SUMMARY OF INVENTION

Technical Problem

It is now assumed that a device can select a plurality of setting methods for performing automatic communication parameter setting processing provided therewith. In a case where a plurality of automatic setting functions are installed on a device, a user of the device is required to select a desired automatic setting method to be activated via a menu screen. However, such a conventional setting method is not easily usable for users of communication apparatuses, because the users are required to select an appropriate automatic wireless parameter setting method according to their preferences. If a user's selection is wrong, the communication apparatus does not perform automatic setting processing and cannot start wireless communication.

Further, in a case where a communication apparatus includes an access point function and a station function that are selectable to perform communication parameter setting processing, a user of the communication apparatus is required to determine whether the communication apparatus operates as an access point or as a station. Therefore, this kind of conventional communication apparatus is not easy for the user to use. If the user's selection is wrong, the communication apparatus does not perform automatic setting processing and cannot start wireless communication.

Solution to Problem

The present invention is directed to a technique capable of improving usability for users of communication apparatuses that can perform automatic communication parameter setting processing according to one of a plurality of methods.

According to an aspect of the present invention, a communication apparatus includes a first setting unit configured to operate as an access point that communicates with another communication apparatus to perform communication parameter setting processing, a second setting unit configured to operate as a station that communicates with an access point to perform communication parameter setting processing, a detection unit configured to detect an apparatus that is currently activating communication parameter setting processing, and a selection unit configured to select first setting processing to be performed by the first setting unit or second setting processing to be performed by the second setting unit according to a detection result obtained by the detection unit.

Advantageous Effects of Invention

The present invention is applicable to a communication apparatus that can perform automatic communication parameter setting processing according to one of a plurality of methods. The communication apparatus according to the present invention can appropriately execute automatic communication parameter setting processing without requiring user's selection of a desired setting method and can improve usability for users of the communication apparatus.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

An example of a communication apparatus according to a first exemplary embodiment of the present invention is described below with reference to attached drawings. The communication apparatus according to the first exemplary embodiment uses a wireless LAN system that conforms to the IEEE802.11 series standard. However, the communication standard for the communication apparatus is not limited to the IEEE802.11 based wireless LAN.

Figure 1:
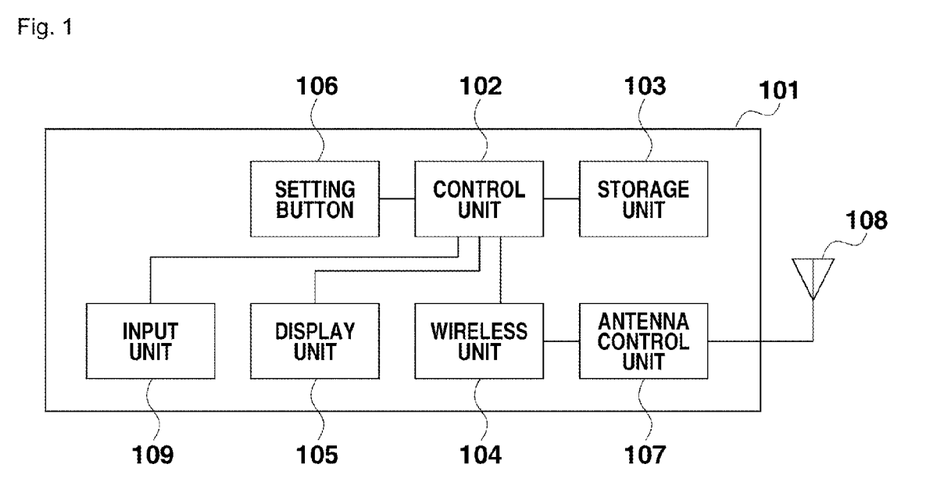
FIG. 1 is a block diagram illustrating an apparatus according to an exemplary embodiment of the present invention.

An example of a hardware configuration according to the present exemplary embodiment is described below. FIG. 1 is a block diagram illustrating an example configuration of a communication apparatus 101. The communication apparatus 101 includes a control unit 102, a storage unit 103, a wireless unit 104, a display unit 105, a setting button 106, an antenna control unit 107, an antenna 108, and an input unit 109.

That control unit 102 can execute a control program loaded from the storage unit 103 to control overall operations performed by the communication apparatus 101. For example, the control unit 102 is a computer, such as a central processing unit (CPU) or a micro processing unit (MPU). The control unit 102 communicates with another communication apparatus to perform automatic communication parameter setting processing. The automatic communication parameter setting processing to be performed by the control unit 102 includes automatic setting processing to be performed as an access point in a wireless LAN infrastructure mode and automatic setting processing to be performed as a station in the wireless LAN infrastructure mode.

The storage unit 103 stores a computer program that can be executed by the control unit 102 to perform various controls, communication parameters and other information. To perform various operations described below, the control unit 102 executes the control program loaded from the storage unit 103. The storage unit 103 is, for example, a memory, such as a read only memory (ROM), a random access memory (RAM), etc., a floppy disk, a hard disk drive, an optical disk, a magneto-optical (MO) disk, a compact disc-ROM (CD-ROM), a CD-recordable (CD-R), a magnetic tape, a nonvolatile memory card, or a digital versatile disc (DVD (DVD-ROM, DVD-R)).

The wireless unit 104 can perform wireless communication. The display unit 105, which can perform various display operations, includes a liquid crystal display (LCD) or a light-emitting diode (LED) configured to output visually recognizable information and a speaker configured to output sounds.

The setting button 106 enables a user to input an instruction to start communication parameter setting processing. The control unit 102 executes processing described below in response to a user's operation performed on the setting button 106. The antenna control unit 107 can control the antenna 108. The input unit 109 enables a user to perform various input operations.

Figure 2:
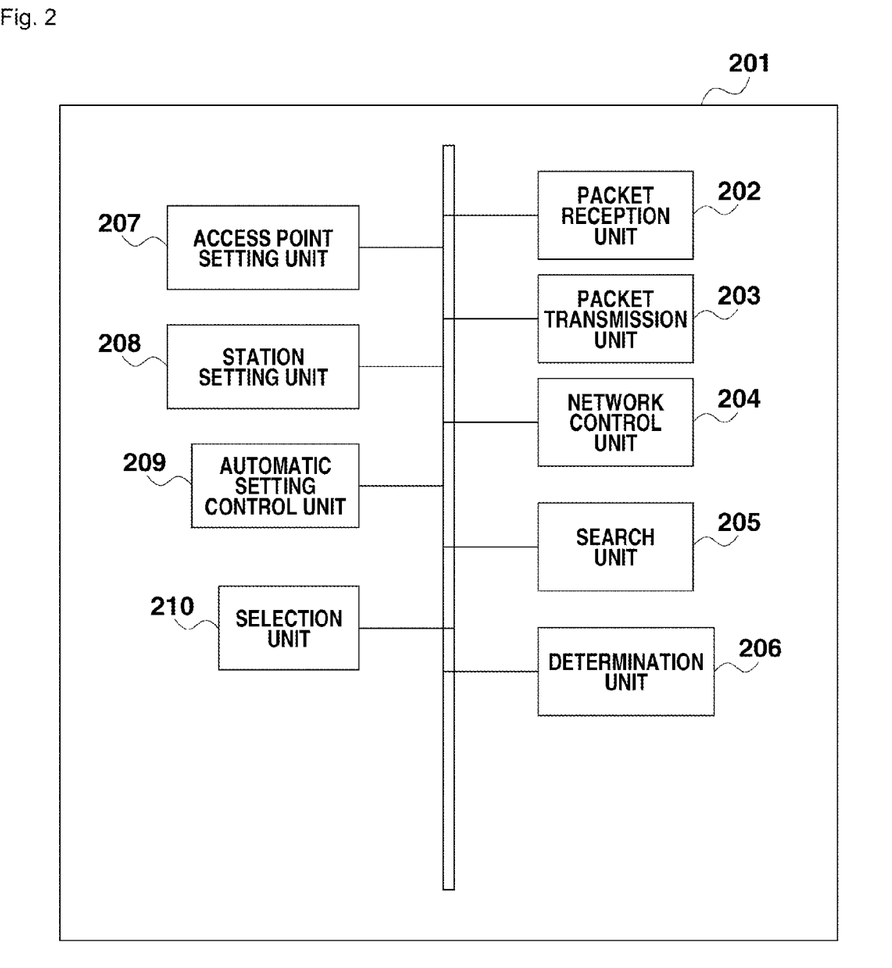
FIG. 2 is a functional diagram illustrating a software configuration of the apparatus according to an exemplary embodiment of the present invention.

FIG. 2 illustrates an example configuration of software functional blocks for realizing automatic communication parameter setting processing that can be executed by the communication apparatus. A communication apparatus 201 illustrated in FIG. 2 includes a packet reception unit 202, a packet transmission unit 203, a network control unit 204, a search unit 205, a determination unit 206, an access point (AP) setting unit 207, a station (STA) setting unit 208, an automatic setting control unit 209, and a selection unit 210.

The packet reception unit 202 can receive packets that are relevant to various communications. The packet reception unit 202 performs reception of a beacon (i.e., a notification signal). Further, the packet reception unit 202 receives a device search signal (e.g., a probe request). The probe request can be referred to as a network search signal for searching a desired network. Further, the packet reception unit 202 can receive a probe response which is a response signal generated in response to the probe request.

The packet transmission unit 203 can transmit packets that are relevant to various communications. For example, the packet transmission unit 203 performs transmission of the beacon. Further, the packet transmission unit 203 performs transmission of the probe request and transmission of the probe response (i.e., the response signal to be generated in response to the probe request). The device search signal and its response signal include various types of information representing a transmission source device (i.e., private information). The private information includes information that indicates whether the automatic communication parameter setting processing is currently activating. The network control unit 204 can control various network connections. For example, the network control unit 204 performs processing for connecting the communication apparatus to a wireless LAN network.

The search unit 205 can search a device that is present in the vicinity of the communication apparatus 201 by transmitting a probe request via the packet transmission unit 203, and receiving a probe response via the packet reception unit 202. Further, the search unit 205 can search a network that is present in the vicinity of the communication apparatus 201 based on a beacon signal received by the packet reception unit 202.

The determination unit 206 can perform processing for detecting an access point that is currently activating automatic communication parameter setting processing dedicated to infrastructure communication based on a search result obtained by the search unit 205. The determination unit 206 can determine whether there is any access point that is currently activating the automatic setting processing based on a detection result. The automatic communication parameter setting processing dedicated to infrastructure communication is, for example, standard processing (e.g., Wi-Fi Protected Setup) or unique processing provided by each manufacturer. Further, the determination unit 206 can determine whether there is any station device that is currently activating automatic communication parameter setting processing dedicated to infrastructure communication.

The access point (AP) setting unit 207 functions (operates) as an access point and provide a station with the communication parameters dedicated to infrastructure communication (i.e., infra-communication). This functional block operates as an access point to communicate with a station according to a predetermined first setting processing protocol and provides the station with communication parameters, such as SSID as a network identifier, an encryption method, an encryption key, an authentication method, and an authentication key, that are required when the station performs wireless communication.

The station (STA) setting unit 208 functions (operates) as a station that communicates with an access point to receive the communication parameters dedicated to infra-communication from the access point. This functional block operates as a station to communicate with an access point according to a predetermined second setting processing protocol and receives, from the access point, communication parameters, such as SSID as a network identifier, an encryption method, an encryption key, an authentication method, and an authentication key, that are required when the station performs wireless communication.

The automatic setting control unit 209 can control activation of an automatic setting method. This functional block selectively activates the access point setting unit 207 or the station setting unit 208 to perform automatic setting processing according to a method selected by the selection unit 210. Further, the automatic setting control unit 209 can monitor whether the setting button 106 is operated by a user and detect a user's operation performed on the setting button 106.

The selection unit 210 can determine whether to execute the automatic communication parameter setting processing as the access point or as the station based on a determination result obtained by the determination unit 206.

Figure 3:
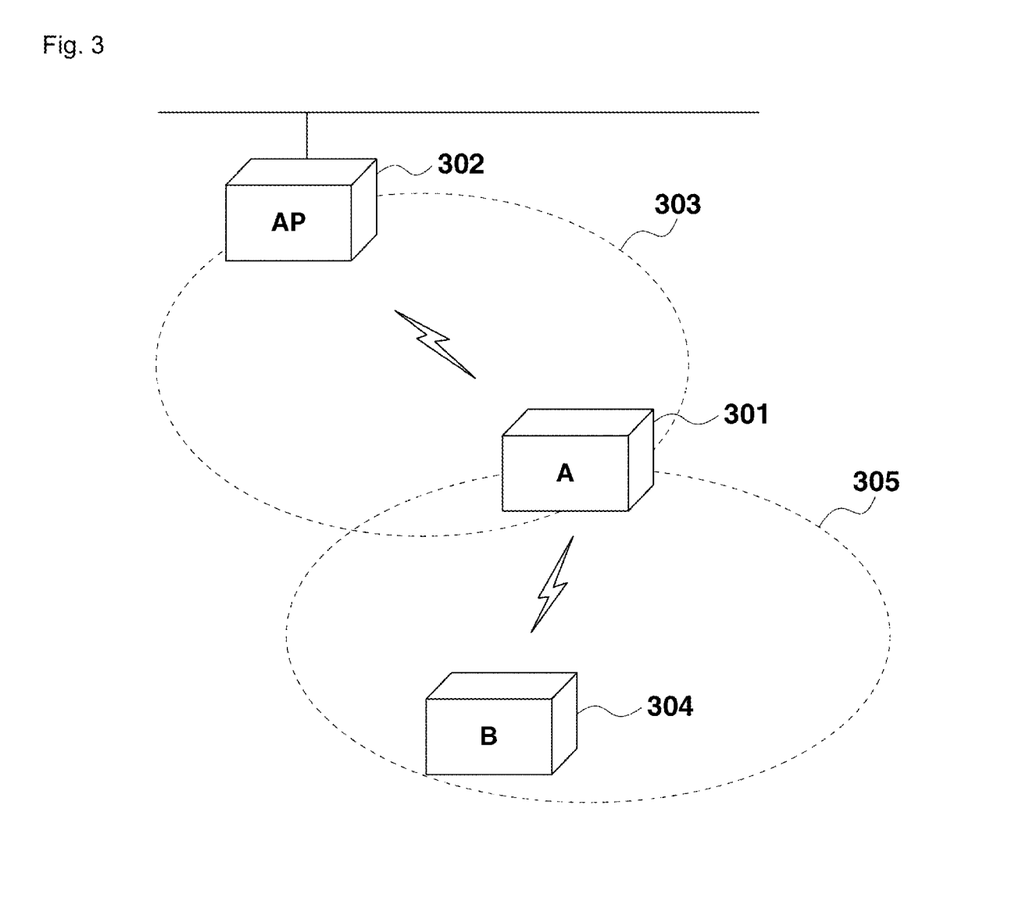
FIG. 3 illustrates an example of a network configuration according to an exemplary embodiment of the present invention.

FIG. 3 illustrates a communication apparatus A 301 (hereinafter, referred to as "apparatus A"), an access point 302, and a communication apparatus B 304 (hereinafter, referred to as "apparatus B"). The apparatus A has a configuration similar to that described with reference to FIG. 1 and FIG. 2. The access point 302 can execute automatic communication parameter setting processing dedicated to infra-communication according to a user's instruction. The access point 302 transmits the communication parameters to the apparatus A through communication performed via a network 303.

When the apparatus A communicates with the access point 302, the apparatus A operates as a station (a slave station) of the access point 302 and performs communication via the access point 302. Further, when the apparatus A communicates with the apparatus B, the apparatus A functions as an access point of another communication apparatus (the apparatus B) without relying on the access point 302 and performs direct communication with the apparatus B. An access point may be referred to as a base station, a master station, or a control apparatus (station). The access point establishes an infrastructure network and performs a control for enabling each station (i.e., a slave station) to perform communication.

Further, the apparatus B executes automatic communication parameter setting processing as a station and performs communication via a network 305 to receive the communication parameters from the apparatus A that serves as the access point.

Figure 4:
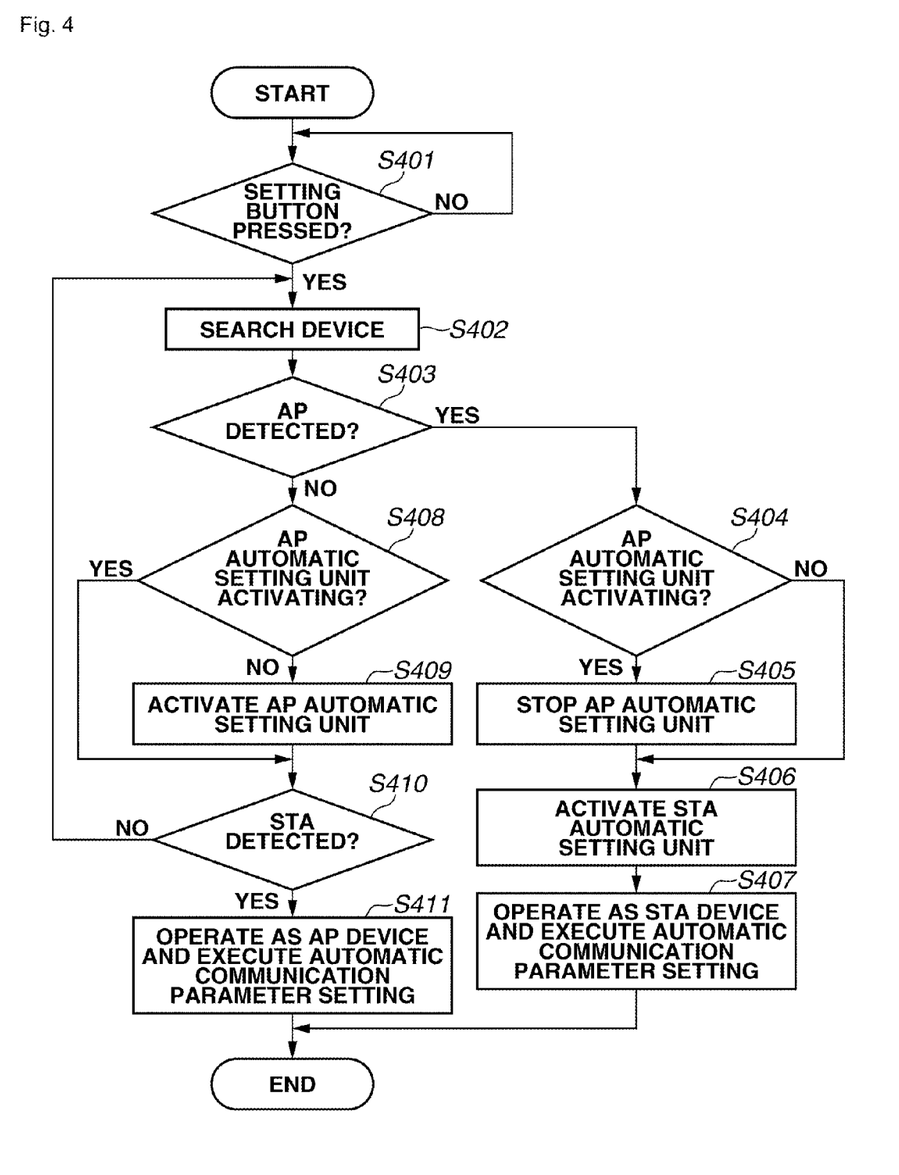
FIG. 4 is a flowchart illustrating an example procedure of communication processing that can be performed by an apparatus A according to an exemplary embodiment of the present invention.

FIG. 4 is a flowchart illustrating an example procedure of communication processing that can be performed by the apparatus A when the setting button 106 is pressed by a user. To perform the processing illustrated in FIG. 4, the control unit 102 executes the computer program loaded from the storage unit 103.

In step S401, the control unit 102 (i.e., the automatic setting control unit 209) monitors whether the setting button 106 is pressed. If it is determined that the setting button 106 is pressed by the user (YES in step S401), the control unit 102 activates the search unit 205.

In step S402, the search unit 205 searches a device that is present in the vicinity of the apparatus A by transmitting a probe request via the packet transmission unit 203 and receives a probe response via the packet reception unit 202. Further, the search unit 205 can search a network that is present in the vicinity of the apparatus A based on a beacon signal received by the packet reception unit 202.

In step S403, the determination unit 206 confirms private information included in the received beacon or the probe response and determines whether there is any access point that is currently activating the automatic communication parameter setting processing dedicated to infra-communication.

If it is determined that the access point currently activating the automatic communication parameter setting processing dedicated to infra-communication is present, the selection unit 210 determines to execute automatic communication parameter setting processing dedicated to infra-communication as a station (i.e., automatic setting processing for a station).

If the selection unit 210 selects executing the automatic setting processing for the station (YES in step S403), then in step S404, the automatic setting control unit 209 confirms whether an operation by the AP setting unit 207 is currently activating: If it is determined that the AP setting unit 207 is currently activated (YES in step S404), then in step S405, the automatic setting control unit 209 stops the AP setting unit 207 that is currently operating.

Then, in step S406, the automatic setting control unit 209 activates the STA setting unit 208. In step S407, the STA setting unit 208 functions as the station and communicates with the access point 302 to execute automatic communication parameter setting processing.

If it is determined that the AP setting unit 207 is not currently activated (NO in step S404), then in step S406, the automatic setting control unit 209 activates the STA setting unit 208. In step S407, the STA setting unit 208 functions as the station and communicates with the access point 302 to execute automatic communication parameter setting processing.

When the STA setting unit 208 executes the automatic setting processing with the access point 302, the apparatus A can acquire the communication parameters from the access point 302. When the apparatus A acquires the communication parameters from the access point 302, the apparatus A starts connecting as the station with the access point 302 based on the acquired communication parameters under the control of the network control unit 204. If the connection is completed, the apparatus A starts to communicate via the access point 302 in the infrastructure network provided by the access point 302.

If it is determined that the access point currently activating the automatic communication parameter setting processing dedicated to infra-communication is not present (NO in step S403), the selection unit 210 determines to execute automatic communication parameter setting processing as an access point (i.e., automatic setting processing for an access point). If the selection unit 210 selects executing the automatic setting processing for the access point (NO in step S403), then in step S408, the automatic setting control unit 209 confirms whether an operation by the AP setting unit 207 is currently activating. If it is determined that the AP setting unit 207 is not currently activated (NO in step S408), then in step S409, the automatic setting control unit 209 activates the AP setting unit 207.

Then, in step S410, the automatic setting control unit 209 confirms a search result acquired in the search processing performed in step S402 and determines whether there is any device that is currently operating as the station that executes automatic communication parameter setting processing dedicated to infra-communication. If it is determined that the device (the apparatus B) currently operating as the station that executes the automatic communication parameter setting processing is present (YES in step S410), then in step S411, the AP setting unit 207 functions as the access point and communicates with the apparatus B to execute automatic communication parameter setting processing and provides the communication parameters. If the apparatus A provides the apparatus B with the communication parameters, the apparatus B tries to establish a connection with the apparatus A. The apparatus A connects with the apparatus B based on the acquired communication parameters under the control of the network control unit 204, and starts operating as the access point to communicate with the apparatus B.

If it is determined that there is not any device currently operating as the station that executes the automatic communication parameter setting processing (NO in step S410), the processing returns to step S402 to perform the above described device search processing again while the AP setting unit 207 is maintained in an activated state.

Figure 5:
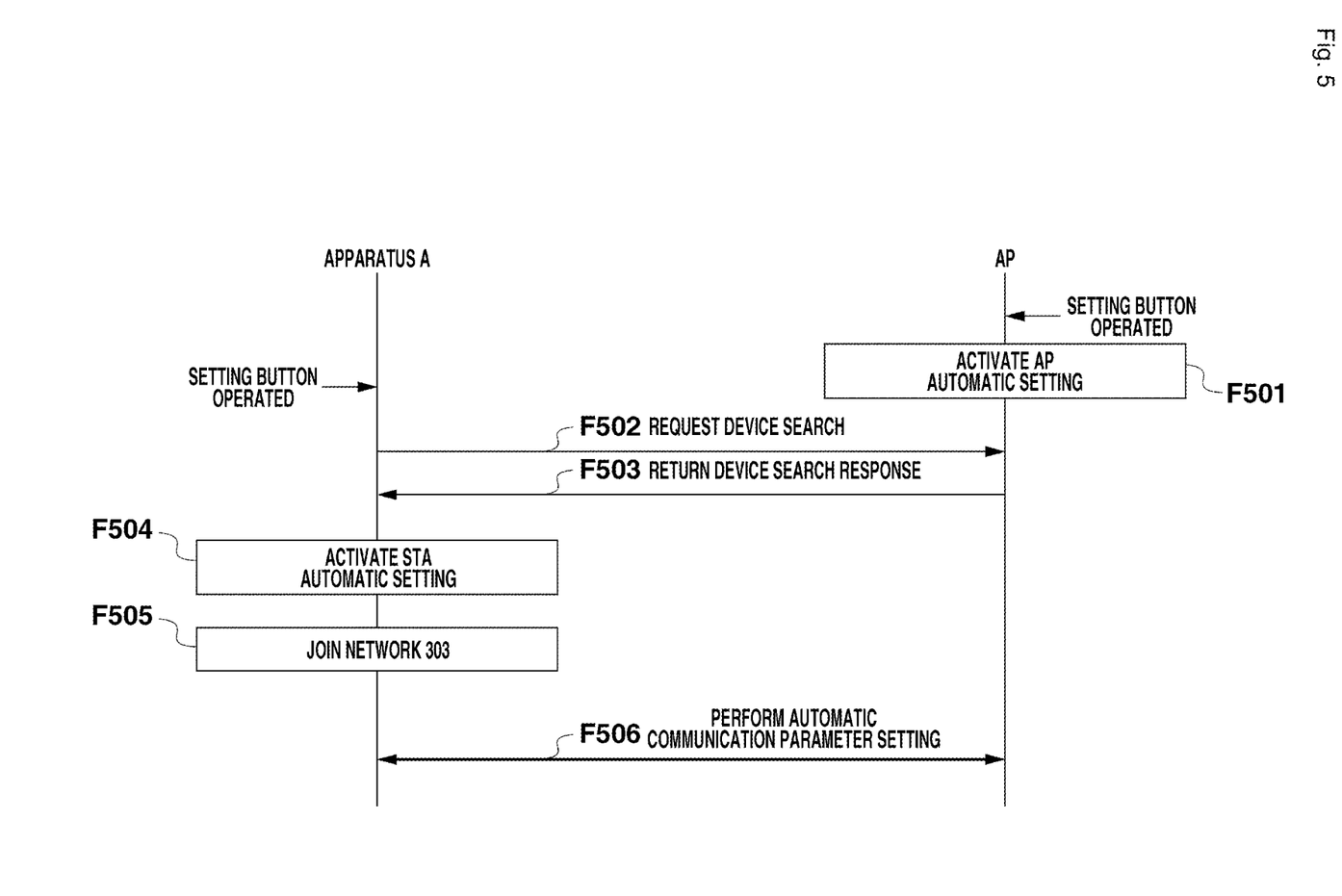
FIG. 5 is an operational sequence diagram illustrating communication performed by the apparatus A and an access point according to an exemplary embodiment of the present invention.

FIG. 5 illustrates an example processing sequence in a case where the access point 302 starts automatic setting processing in response to pressing of its setting button and then the setting button 106 of the apparatus A is pressed to perform automatic communication parameter setting processing between the apparatus A and the access point 302.

If the setting button of the access point 302 is pressed, then in step F501, the access point 302 activates automatic communication parameter setting processing dedicated to infra-communication. After the automatic communication parameter setting processing is started, the access point 302 transmits a beacon or a probe response including information indicating that the access point 302 is currently activating the automatic setting processing.

If the setting button 106 of the apparatus A is pressed, the apparatus A starts executing the processing illustrated in FIG. 4. In step F502, the apparatus A transmits a device search signal (i.e., a probe request) to perform network search processing and confirms whether there is any device that is currently activating automatic setting processing in the vicinity of the apparatus A. In step F503, the access point 302 transmits a response signal (i.e., a probe response) to the apparatus A. In this case, the probe response returned from the access point 302 includes private information indicating that the access point 302 is currently activating the automatic setting processing.

If the apparatus A receives the probe response transmitted from the access point 302, the apparatus A confirms the access point that is currently activating automatic communication parameter setting processing dedicated to infra-communication. If the apparatus A finds any access point that is currently activating the automatic communication parameter setting processing, then in step F504, the apparatus A activates STA automatic communication parameter setting processing as STA.

In step F505, the apparatus A joins the network 303 provided by the access point 302 to acquire communication parameters. In step F506, the apparatus A communicates with the access point 302 to execute automatic communication parameter setting processing. As a result of processing in step F506, the apparatus A receives the communication parameters from the access point 302.

Figure 6:
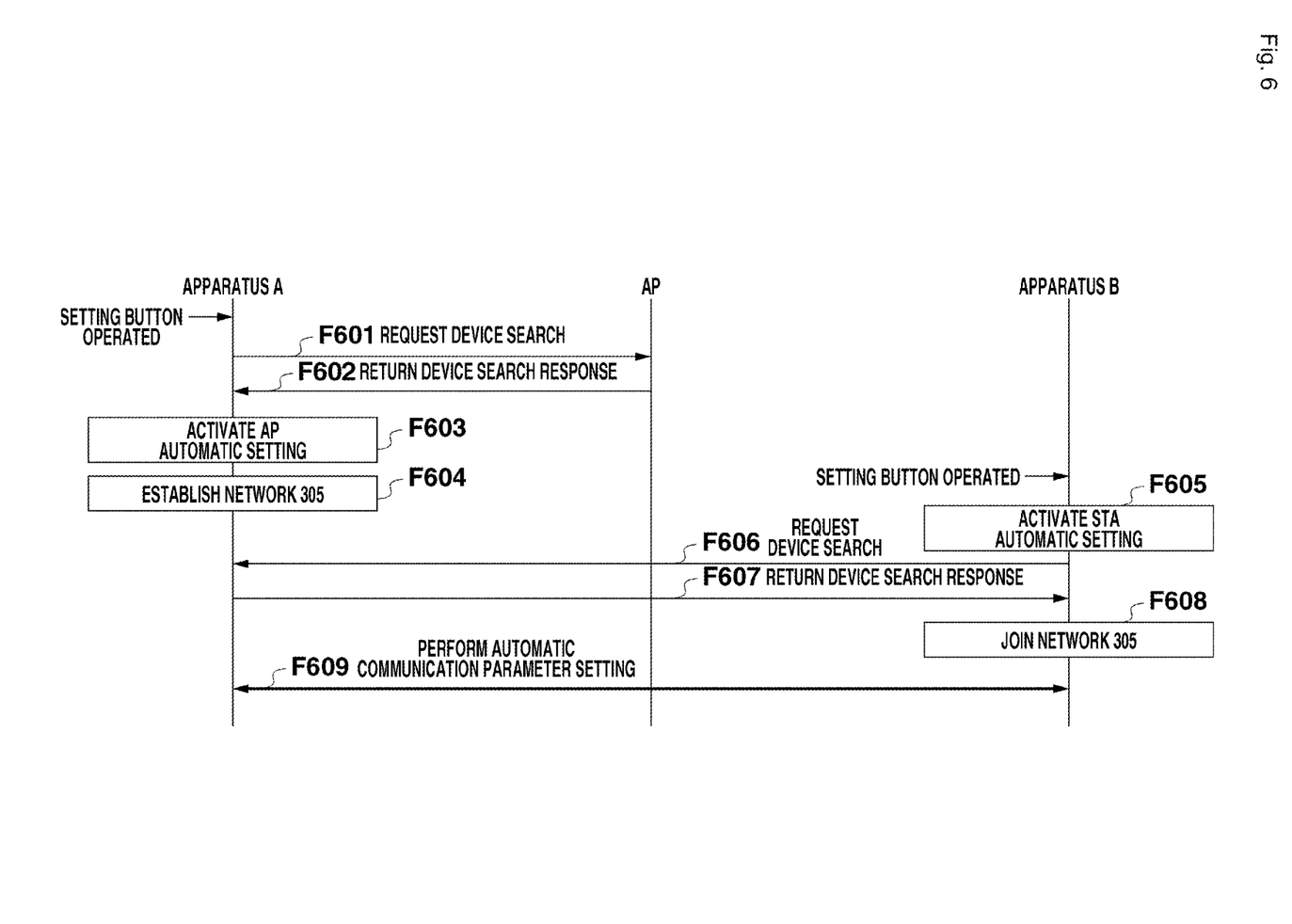
FIG. 6 is an operational sequence diagram illustrating communication performed by the apparatus A, an apparatus B, and the access point according to an exemplary embodiment of the present invention.

FIG. 6 illustrates an example processing sequence in a case where the setting button 106 of the apparatus A is first pressed and then the setting button of the apparatus B is pressed to execute automatic communication parameter setting processing between the apparatus A and the apparatus B.

If the setting button 106 of the apparatus A is pressed, the apparatus A starts executing the processing illustrated in FIG. 4. In step F601, the apparatus A transmits a probe request to perform network search processing and confirms whether there is any device that is currently activating automatic setting processing in the vicinity of the apparatus A. In step F602, the access point 302 transmits a probe response indicating that the access point 302 is not currently activating the automatic setting processing to the apparatus A. Therefore, in step F603, the apparatus A activates AP automatic communication parameter setting processing as AP.

If the activation of the AP automatic communication parameter setting processing is completed, then in step F604, the apparatus A operates as the access point to establish the network 305. In this case, if the apparatus A is already connected to the access point 302, the apparatus A operates as the access point and establishes the network 305 while joining the network 303 of the access point 302 as the station. Further, if the apparatus A is not connected to the access point 302, the apparatus A establishes the network 305 instead of joining the network 303 of the access point 302.

If the setting button of the apparatus B is pressed, then in step F605, the apparatus B activates STA automatic communication parameter setting processing to operate as the station. In this case, similar to the apparatus A, the apparatus B can execute the processing illustrated in FIG. 4 to activate the STA automatic communication parameter setting processing. If the STA automatic communication parameter setting processing is started, then in step F606, the apparatus B transmits a probe request and confirms whether there is any device that is currently activating automatic communication parameter setting in the vicinity of the apparatus B.

If the apparatus A receives the probe request transmitted from the apparatus B, then in step F607, the apparatus A transmits a probe response to the apparatus B. In this case, the probe response transmitted to the apparatus B includes private information indicating that the apparatus A is currently activating the AP automatic setting processing. If the apparatus B receives the probe response transmitted from the apparatus A, then in step F608, the apparatus B joins the network 305 established by the apparatus A to acquire the communication parameters. Then, in step F609, the apparatus A and the apparatus B communicate with each other to perform automatic communication parameter setting processing. In this case, the apparatus A operates as the access point to provide the communication parameters to the apparatus B.

Figure 7:
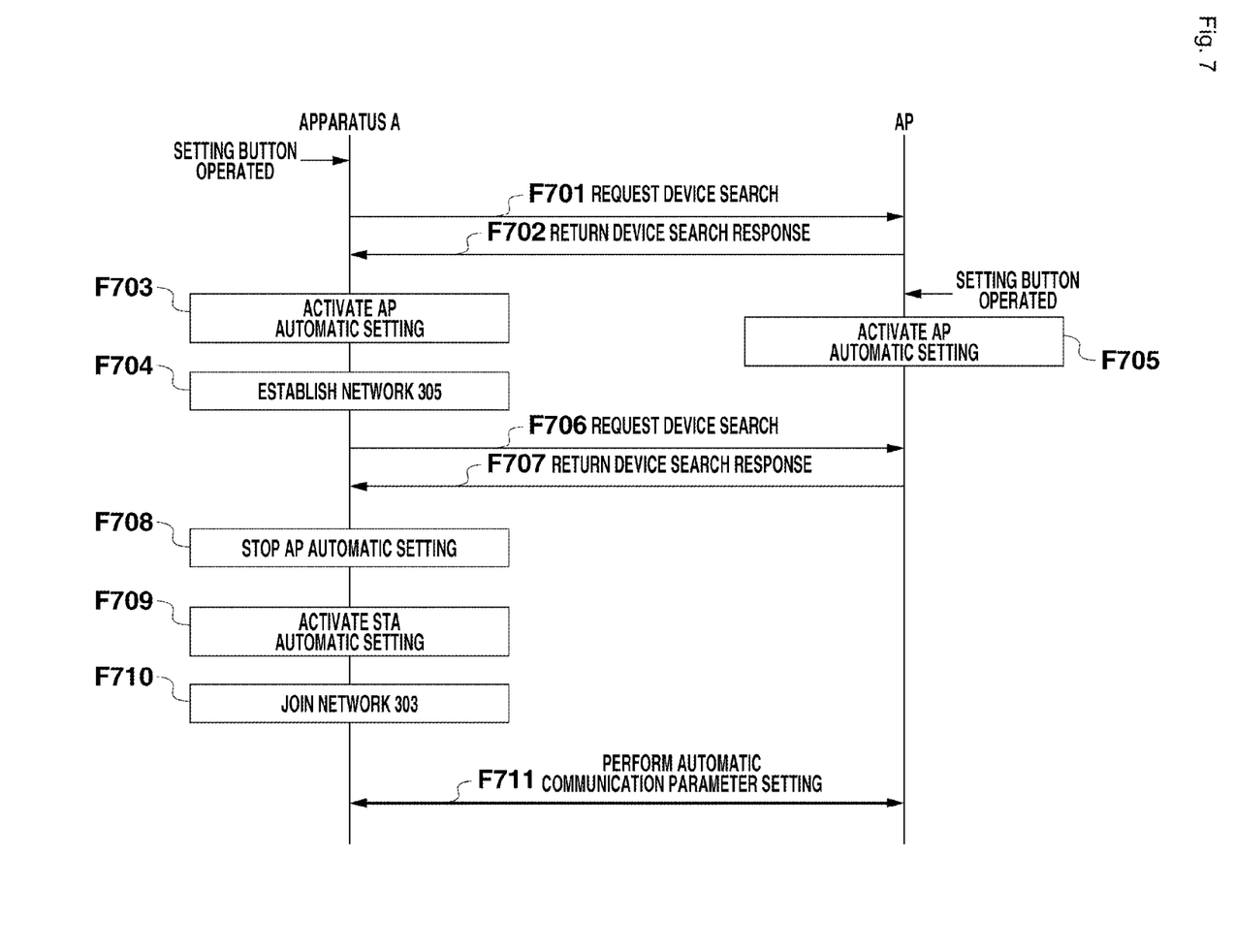
FIG. 7 is an operational sequence diagram illustrating communication performed by the apparatus A and the access point according to an exemplary embodiment of the present invention.

FIG. 7 illustrates an example processing sequence in a case where the setting button 106 of the apparatus A is first pressed and then the setting button of the access point 302 is pressed to execute automatic communication parameter setting processing between the apparatus A and the access point 302.

If the setting button 106 of the apparatus A is pressed, the apparatus A starts executing the processing illustrated in FIG. 4. In step F701, the apparatus A transmits a probe request and confirms whether there is any device that is currently activating automatic communication parameter setting in the vicinity of the apparatus A. In this case, the access point 302 is not currently activating the automatic setting processing. Therefore, in step F702, the access point 302 transmits a probe response indicating that the access point 302 is not currently activating the automatic setting processing to the apparatus A. Accordingly, in step F703, the apparatus A activates AP automatic communication parameter setting processing as AP. If the activation of the AP automatic communication parameter setting processing is completed, then in step F704, the apparatus A establishes the network 305 and continues the device search processing illustrated in FIG. 4.

Then, if the setting button of the access point 302 is pressed, then in step F705, the access point 302 activates automatic communication parameter setting processing dedicated to infra-communication. After the automatic communication parameter setting processing is started, the access point 302 transmits a beacon or a probe response including information indicating that the access point 302 is currently activating the automatic setting processing.

At this moment, the apparatus A has not found any device that executes automatic setting processing. Therefore, in step F706, the apparatus A transmits the probe request again and confirms whether there is any device that is currently activating automatic communication parameter setting in the vicinity of the apparatus A. If the access point 302 receives the probe request transmitted from the apparatus A, then in step F707, the access point 302 returns a probe response including private information indicating that the access point 302 is currently activating the automatic setting processing.

In step F707, the apparatus A receives the probe response including the private information indicating that the access point 302 is currently activating the automatic setting processing. Upon reception of the latest probe response, the apparatus A recognizes that the access point 302 is activating the automatic communication parameter setting processing dedicated to infra-communication. Therefore, in step F708, the apparatus A stops the AP automatic communication parameter setting processing that is currently executed. Then, in step F709, the apparatus A activates STA automatic communication parameter setting processing.

If the activation of the STA automatic communication parameter setting processing is completed, then in step F710, the apparatus A joins the network 303 of the access point 302 as the station to acquire the communication parameters and communicates with the access point 302 to execute automatic setting processing. If the automatic setting processing is executed, then in step F711, the apparatus A acquires the communication parameters from the access point 302.

As described above, the apparatus A can automatically detect any peripheral device that is currently activating automatic setting processing and can appropriately execute the automatic communication parameter setting processing.

When the device search processing is executed in step S402 illustrated in FIG. 4, the search unit 205 may detect two or more devices that are currently activating automatic setting processing. In this case, the automatic setting control unit 209 may erroneously communicate with an unintended apparatus to perform the automatic communication parameter setting processing. Therefore, the apparatus A terminates the processing as an error so as not acquire any communication parameters from the unintended apparatus or provide the unintended apparatus with any communication parameters.

For example, in step S402 illustrated in FIG. 4, if the presence of an access point that is currently activating the automatic communication parameter setting processing dedicated to infra-communication is recognized, the automatic setting control unit 209 confirms whether there is any device that is currently activating the STA automatic communication parameter setting processing (see step S410). If a station device that is currently activating the STA automatic communication parameter setting processing is also recognized, the automatic setting control unit 209 cannot determine whether to perform the automatic setting processing as a station or as an access point. Therefore, the apparatus A terminates the processing as an error.

Further, in a case where two or more access points currently activating the automatic communication parameter setting processing dedicated to infra-communication are recognized, the automatic setting control unit 209 cannot determine a target access point with which the apparatus A performs automatic communication parameter setting processing. Therefore, the apparatus A terminates the processing as an error. As described above, if there are two or more devices that can be a target with which the apparatus A performs automatic communication parameter setting processing, the above described exemplary embodiment prevents the apparatus A from activating the automatic setting processing. Thus, the above described exemplary embodiment can prevent the apparatus A from acquiring any communication parameters from an unintended apparatus or providing any communication parameters to an unintended apparatus.

As apparent from the above described exemplary embodiment, in a case where an apparatus is selectively operable as an access point or as a station to perform automatic setting processing, the apparatus can appropriately execute the automatic communication parameter setting processing without requiring a user to select a setting method and can improve usability for a user of the communication apparatus.

The apparatus according to the above described exemplary embodiment checks whether an access point is currently activating automatic setting processing dedicated to infra-communication and checks whether another apparatus (e.g., a station) is currently activating station automatic setting processing. Then, the apparatus selects appropriate automatic setting processing to be performed based on a check result and performs the selected processing. Therefore, the apparatus according to the above described exemplary embodiment can perform automatic setting processing suitable for a momentary communication environment. As a result, the present invention can improve usability for users of the apparatuses.

The above described exemplary embodiment is a mere example that can realize the present invention. However, the present invention is not limited to the above described exemplary embodiment and can be modified in various ways without departing from the gist of the present invention.

The above described exemplary embodiment uses the IEEE802.11 based wireless LAN as an example. However, the present invention can be embodied by a communication apparatus that uses other wireless medium, such as wireless universal serial bus (USB), multi band orthogonal frequency division multiplexing (OFDM) alliance (MBOA), Bluetooth (registered trademark), ultra-wideband (UWB), or ZigBee. Further, the present invention can be embodied by a communication apparatus that uses a wired communication medium (e.g., wired LAN). Further, wireless USB, wireless 1394, and WINET are examples of the UWB.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-158944 filed Jul. 3, 2009, which is hereby incorporated by reference herein in its entirety.

The invention claimed is:

1. A communication apparatus comprising:
   a processor; and
   a memory coupled to the processor, the memory having instructions that, when executed by the processor, perform operations comprising:
   operating as an access point that communicates with another communication apparatus to perform communication parameter setting processing by a first setting unit;
   operating as a station that communicates with an access point to perform communication parameter setting processing by a second setting unit;
   detecting an apparatus that is currently activating communication parameter setting processing by a detection unit; and
   selecting, by a selection unit, first setting processing to be performed by the first setting unit in a case where an access point that is currently activating the communication parameter setting processing is not detected by the detection unit, and selecting second setting processing to be performed by the second setting unit in a case where an access point that is currently activating the communication parameter setting processing is detected by the detection unit.

2. The communication apparatus according to claim 1, wherein the selection unit is configured to select the second setting processing to be performed by the second setting unit in a case where an access point that is currently activating the communication parameter setting processing is detected by the detection unit and there is not any other communication apparatus that is currently activating the communication parameter setting processing as a station.

3. The communication apparatus according to claim 1, wherein the selection unit is configured to select the first setting processing to be performed by the first setting unit in a case where another communication apparatus that is currently activating the communication parameter setting processing as a station is detected by the detection unit and there is not any access point that is currently activating the communication parameter setting processing.

4. The communication apparatus according to claim 1, wherein the detection unit is configured to detect the apparatus that is currently activating the communication parameter setting processing in a state where the first setting processing to be performed by the first setting unit is activated, in a case where the selection unit selects execution of the first setting processing to be performed by the first setting unit and activates the selected setting processing, and there is not any access point that is currently activating the communication parameter setting processing and there is not any other station that is currently activating the communication parameter setting processing.

5. The communication apparatus according to claim 4, wherein after the first setting processing by the first setting unit is activated, if any access point that is currently activating the communication parameter setting processing is detected by the detection unit, the first setting processing is stopped.

6. A method for controlling a communication apparatus, comprising:
   detecting an apparatus that is currently activating communication parameter setting processing; and
   selecting to operate as an access point that communicates with another communication apparatus to perform communication parameter setting processing in a case where an access point that is currently activating the communication parameter setting processing is not detected, and selecting to operate as a station that communicates with an access point to perform communication parameter setting processing in a case where an access point that is currently activating the communication parameter setting processing is detected.

7. A non-transitory computer readable storage medium storing a computer-executable program of instructions for causing a computer to function as a communication apparatus according to claim 1.

8. The non-transitory computer readable storage medium according to claim 7, wherein in the communication apparatus, the selection unit is configured to select the second setting processing to be performed by the second setting unit in a case where an access point that is currently activating the communication parameter setting processing is detected by the detection unit and there is not any other communication apparatus that is currently activating the communication parameter setting processing as a station.

9. The non-transitory computer readable storage medium according to claim 7, wherein in the communication apparatus, the selection unit is configured to select the first setting processing to be performed by the first setting unit in a case where another communication apparatus that is currently activating the communication parameter setting processing as a station is detected by the detection unit and there is not any access point that is currently activating the communication parameter setting processing.

10. The non-transitory computer readable storage medium according to claim 7, wherein in the communication apparatus, the detection unit is configured to detect the apparatus that is currently activating the communication parameter setting processing in a state where the first setting processing to be performed by the first setting unit is activated, in a case where the selection unit selects execution of the first setting processing to be performed by the first setting unit and activates the selected setting processing, and there is not any access point that is currently activating the communication parameter setting processing and there is not any other station that is currently activating the communication parameter setting processing.

11. The non-transitory computer readable storage medium according to claim 10, wherein in the communication apparatus, after the first setting processing by the first setting unit is activated, if any access point that is currently activating the communication parameter setting processing is detected by the detection unit, the first setting processing is stopped.

12. A communication apparatus comprising:
- a first setting unit configured to operate as an access point that communicates with another communication apparatus to perform communication parameter setting processing;
- a second setting unit configured to operate as a station that communicates with an access point to perform communication parameter setting processing;
- a detection unit configured to detect an apparatus that is currently activating communication parameter setting processing; and
- a selection unit configured to select first setting processing to be performed by the first setting unit or second setting processing to be performed by the second setting unit according to a detection result obtained by the detection unit,
wherein the detection unit is configured to detect the apparatus that is currently activating the communication parameter setting processing in a state where the first setting processing to be performed by the first setting unit is activated, in a case where the selection unit selects execution of the first setting processing to be performed by the first setting unit and activates the selected setting processing, and there is not any access point that is currently activating the communication parameter setting processing and there is not any other station that is currently activating the communication parameter setting processing.

13. The communication apparatus according to claim 12, wherein after the first setting processing by the first setting unit is activated, if any access point that is currently activating the communication parameter setting processing is detected by the detection unit, the first setting processing is stopped.

* * * * *